(12) United States Patent
Ono (10) Patent No.: US 8,050,677 B2
(45) Date of Patent: Nov. 1, 2011

(54) MOBILE COMMUNICATION TERMINAL AND CALL HANDOVER METHOD

(75) Inventor: Koji Ono, Shijonawate (JP)

(73) Assignee: Kyocera Corporation, Kyoto (JP)

( * ) Notice: Subject to any disclaimer, the term of this patent is extended or adjusted under 35 U.S.C. 154(b) by 927 days.

(21) Appl. No.: 11/822,893

(22) Filed: Jul. 11, 2007

(65) Prior Publication Data
US 2008/0014926 A1    Jan. 17, 2008

(30) Foreign Application Priority Data
Jul. 13, 2006   (JP) ................................. 2006-193179

(51) Int. Cl.
*H04W 36/00* (2009.01)
(52) U.S. Cl. ........................................ 455/436; 455/461
(58) Field of Classification Search ........................ None
See application file for complete search history.

(56) References Cited

U.S. PATENT DOCUMENTS

| | | | | |
|---|---|---|---|---|
| 2002/0068575 | A1* | 6/2002 | Agrawal et al. | 455/445 |
| 2004/0095945 | A1* | 5/2004 | Woog | 370/401 |
| 2005/0003821 | A1* | 1/2005 | Sylvain | 455/444 |
| 2006/0285674 | A1* | 12/2006 | Le Creff et al. | 379/211.01 |

FOREIGN PATENT DOCUMENTS
JP    2000-232678    8/2000

OTHER PUBLICATIONS
Office Action from Japanese Patent Application No. 2006-193179, mailed on Mar. 8, 2011.

* cited by examiner

*Primary Examiner* — Erika Gary
(74) *Attorney, Agent, or Firm* — Morrison & Foerster LLP (57) ABSTRACT

Disclosed is a mobile communication terminal including: a user information storage unit for storing user information having a terminal identifier for identifying an arbitrary communication terminal, and a user identifier for identifying the user of the communication terminal associated with each other; an identifier storage unit for storing, at the time of beginning of a call with the other party of the call, a first identifier for identifying the communication terminal of the other party of the call; a terminal identifier determination unit for determining whether the first terminal identifier and a second terminal identifier are associated with the same user identifier, with reference to the user information, upon receipt of a call-out signal including the second terminal identifier during the call with the communication terminal of the other party; and a call controller for handing over the call to a communication terminal indicated by the second terminal identifier when the terminal identifier determination unit determines that the first and second terminal identifiers are associated with the same user identifier.

4 Claims, 10 Drawing Sheets

USER INFORMATION

| USER ID | .... |
|---|---|
| USER NAME | .... |
| TERMINAL ID1 / ID TYPE | .... / MOBILE PHONE NUMBER |
| TERMINAL ID2 / ID TYPE | .... / FIXED-LINE PHONE NUMBER |
| TERMINAL ID3 / ID TYPE | .... / E-MAIL ADDRESS |

FIG. 8

MOBILE COMMUNICATION TERMINAL AND CALL HANDOVER METHOD

CROSS REFERENCE TO RELATED APPLICATION

This application is based upon and claims the benefit of priority from prior Japanese Patent Application P2006-193179 filed on Jul. 13, 2006; the entire contents of which are incorporated by reference herein.

BACKGROUND OF THE INVENTION

1. Field of the Invention

The present invention relates to a mobile communication terminal configured to switch a call path to another, and to a call handover method.

2. Description of the Related Art

There has been heretofore proposed a technique that allows a mobile telephone terminal to stably communicate with a fixed-line telephone terminal by connecting the mobile telephone terminal to the fixed-line telephone terminal through a wire. This technique also allows a destination of the charge for such a call to be selected when an appropriate pin number is inputted to the mobile telephone terminal.

Furthermore, through advances in a short-range wireless communication technology such as Bluetooth (registered trademark), a communication service called, fixed mobile convergence (FMC) has been attracting attention. In this communication service, a mobile telephone terminal is wirelessly connected to a fixed-line telephone terminal and then is used as a cordless handset in the house.

According to the FMC, a mobile telephone terminal performs communications using a mobile telephone terminal network when the mobile telephone terminal is located outside the house, and performs communications using a fixed-line telephone network when the mobile telephone terminal is located in the house. Since the mobile telephone terminal performs communications using the fixed-line telephone network when the mobile telephone terminal is located in the house, the costs of the call can be reduced or the communication speed can be increased.

Here, a switching (hereinafter, termed as a "call handover") from a mobile telephone network to a fixed-line telephone network while retailing a call without disconnection is required in a case where a user moves to the inside of the house from the outside of the house during a call being made using a mobile telephone network. In order to achieve such a call handover, however, the aforementioned FMC needs constructing a dedicated system in a communication network. Moreover, in the FMC, the mobile telephone terminal and the fixed-line telephone terminal need to use the same telephone company and the same telephone number. For this reason, when an existing communication network is used, it is difficult to perform a call handover between a mobile telephone network and a fixed-line telephone network while retaining a call without disconnection.

SUMMARY OF THE INVENTION

The present invention provides a mobile communication terminal including: a user information storage unit configured to store user information in which a terminal identifier for identifying an arbitrary communication terminal, and a user identifier for identifying a user of the communication terminal are associated with each other; an identifier storage unit configured to store, at the time of beginning of a call with the other party of the call, a first identifier for identifying the communication terminal of the other party of the call; a terminal identifier determination unit configured to determine with reference to the user information, in a case where a call-out signal including a second terminal identifier is received during the call with the communication terminal of the other party, whether the first terminal identifier and the second terminal identifier are associated with the same user identifier; and a call controller configured to hand over the call to a communication terminal indicated by the second terminal identifier in a case where the terminal identifier determination unit determines that the first terminal identifier and the second terminal identifier are associated with the same user identifier.

DETAILED DESCRIPTION OF THE INVENTION

Hereinafter, descriptions will be given of embodiments according to the present invention with reference to drawings. In the descriptions of the drawings according to the embodiments to be described below, the same or similar reference numerals are assigned to components or portions that are the same as or similar to each other.

First Embodiment (1) Overview of Communication System

First, a description will be given of an overview of a communication system according to the first embodiment of the present invention with reference to FIGS. 1 and 2.

(1.1) Configuration Overview of Communication System

Figure 1:
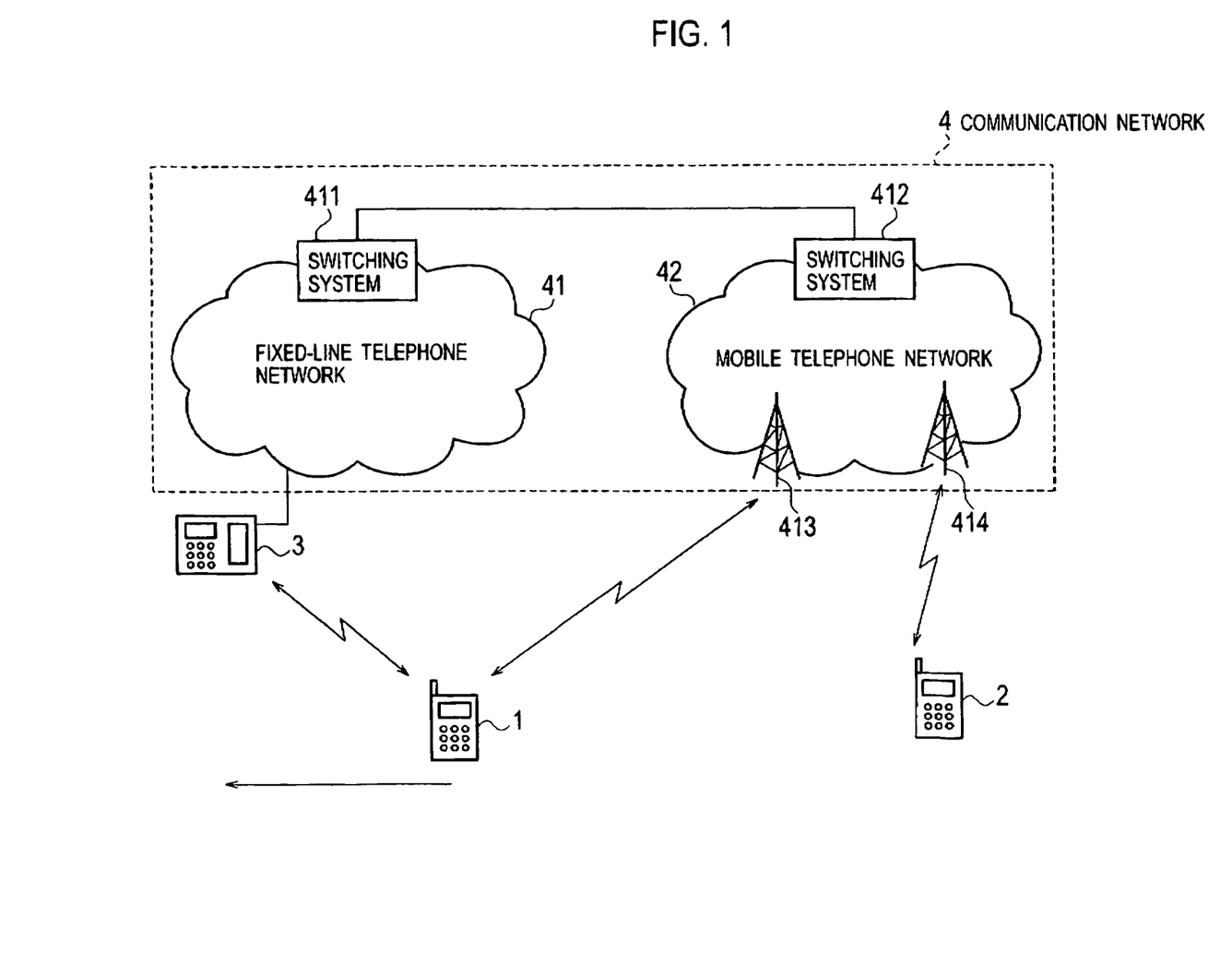
FIG. 1 is a schematic diagram showing an example of an overall configuration of a mobile communication system according to a first embodiment of the present invention.
Figure 2:
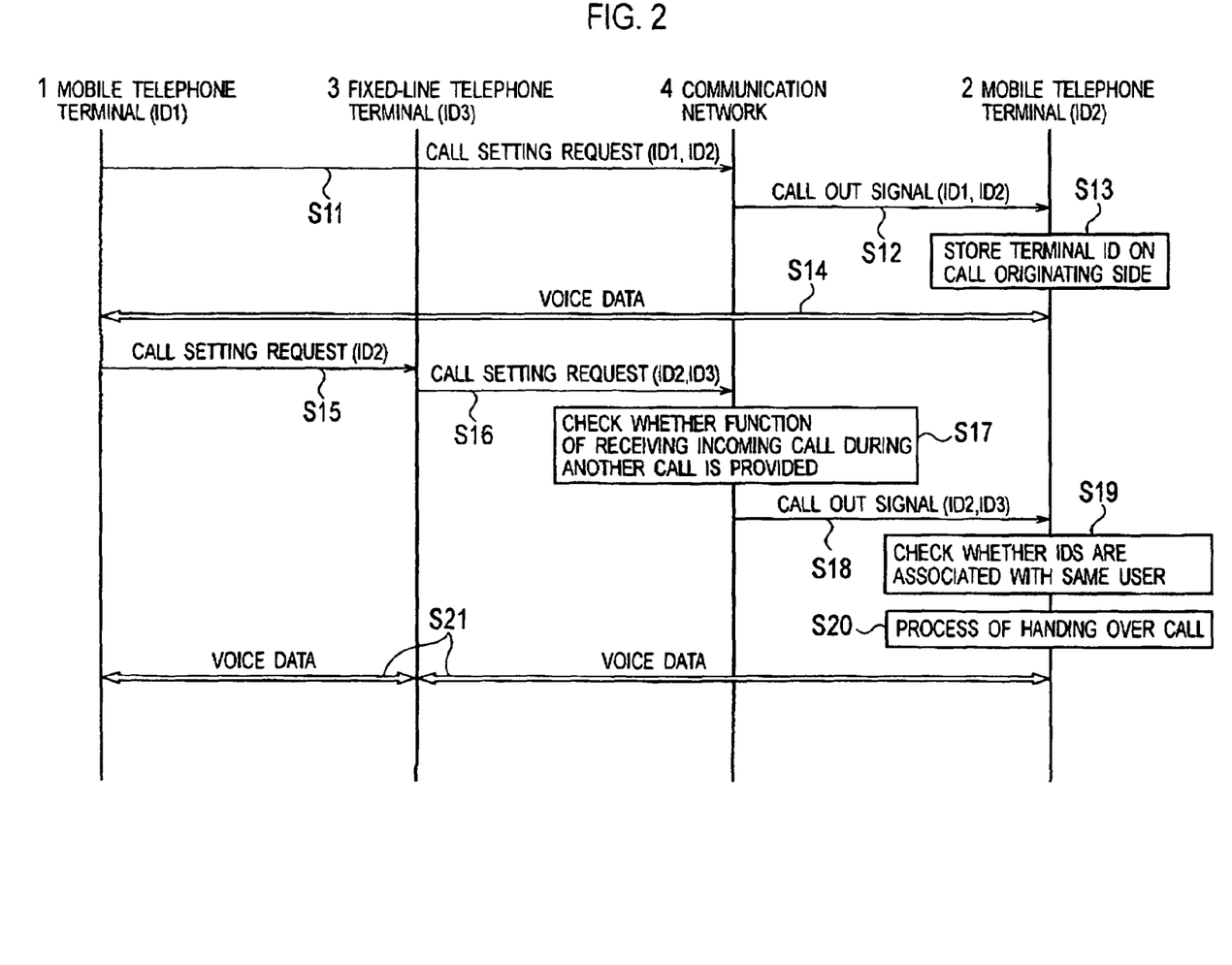
FIG. 2 is a sequence diagram showing a call handover method according to the first embodiment of the invention.

FIG. 1 is a diagram of an overview of a configuration of the mobile communication system according to the first embodiment.

As shown in FIG. 1, the mobile communication system is provided with mobile telephone terminals (mobile communication terminals) 1 and 2, a fixed-line telephone terminal (fixed-line communication terminal) 3 and a communication network 4.

The mobile telephone terminal 1 is provided with two channels of radio communication interfaces so that the mobile telephone terminal 1 can simultaneously communicate with the fixed-line telephone terminal 3 and the communication network 4. In the first embodiment, a description will be given of a case where the mobile telephone terminal 1 performs an operation to originate a call, and the mobile telephone terminal 2 performs an operation to receive the call.

The communication network 4 includes a fixed-line telephone network 41 and a mobile telephone network 42. The fixed-line telephone network 41 and the mobile telephone network 42 are connected with each other and are capable of communicating with each other.

The fixed-line telephone network 41 is provided with a switching system 411 and a plurality of subscriber switching systems although the illustrations of the systems are omitted here. Each of the plurality of subscriber systems is connected to a fixed-line telephone terminal or the like.

The mobile telephone network 42 is provided with a switching system 412 configured to control positions, calls and services, and a plurality of base stations 413 and 414. Each of the plurality of base stations 413 and 414 constitutes an area called, a cell in which the base station 413 or 414 is capable of communicating with a mobile telephone terminal.

In an example shown in FIG. 1, the mobile telephone terminal 1 is located in the cell of the base station 413 and communicates with the base station 413. The mobile telephone terminal 2 is located in the cell of the base station 414 and communicates with the base station 414.

Furthermore, the switching system 412 of the mobile telephone network 42 provides a service including a feature to allow a user of a mobile telephone terminal to take an incoming call during a phone conversation by use of the mobile telephone terminal (hereinafter, the service is referred to as a call waiting), the service being applied to a case where there is an incoming call to a mobile telephone terminal while the mobile telephone terminal is being used for another call.

In a call waiting service, while a certain mobile telephone terminal is being used for a phone conversation with the other party of the call, a switching system notifies the mobile telephone terminal that there is an incoming call from a different party. Then the system allows the user of the mobile telephone terminal to have a conversation with the different party.

In the first embodiment, an assumption is made that the mobile telephone terminal 2 has been signed and registered on a call waiting service. Incidentally, as an example of a call waiting service, "Catch Phone" (registered trademark) can be cited as an example.

Moreover, the mobile telephone terminal 2 is configured to previously store, therein, user information in which a terminal identifier for identifying a communication terminal (hereinafter, referred to as a terminal ID) and a user identifier for identifying the user of the communication terminal (hereinafter, referred to as a user ID) are associated with each other.

As the terminal ID, a phone number can be used. However, any information that can be used to uniquely identify the communication terminal may be used. Accordingly, the terminal ID is not limited to a phone number. As the user information, a function of an address book of the mobile telephone terminal 2 can be utilized, for example. The details of the user information will be described later.

(1.2) Operation Overview of Communication System

Next, a description will be given of an overview of an operation of the mobile communication system of FIG. 1. Specifically, a description will be given of a call handover method that is applied to the mobile communication system of FIG. 1. Here, the description will be given of a case where the mobile telephone terminal 1 first communicates with the mobile telephone network 42, and thereafter communicates with the fixed-line telephone network 41 via the fixed-line telephone terminal 3. FIG. 2 is a sequence diagram showing the call handover method.

In step S11, the mobile telephone terminal 1 on the call originating side specifies the terminal ID of the mobile telephone terminal 2 on the call receiving side and then originates a call.

It should be noted that for the sake of convenience of description, the terminal IDs of the mobile telephone terminal 1, the mobile telephone terminal 2, and the fixed-line telephone terminal 3 are denoted by reference numerals "ID1," "ID2" and "ID3," respectively. A call setting request to be transmitted by the mobile telephone terminal 1 to the communication network 4 (mobile telephone network 42) includes the terminal ID of the mobile telephone terminal 1, "ID1" and the terminal ID of the mobile telephone terminal, "ID2".

In step S12, the mobile telephone network 42 (base station 414) broadcasts a call-out signal including the terminal ID of the mobile telephone terminal 1, "ID1" and the terminal ID of the mobile telephone terminal 2, "ID2." The mobile telephone terminal 2 on the call receiving side receives the broadcasted call-out signal.

In step S13, the mobile telephone terminal 2 on the call receiving side stores the terminal ID of the mobile telephone terminal 1 on the call originating side, "ID1."

In step S14, a call between the mobile telephone terminals 1 and 2 begins.

Here, an assumption is made that the mobile telephone terminal 1 on the call originating side has moved, so that the state of the mobile telephone terminal 1 on the call originating side can thus communicate with the fixed-line telephone terminal 3.

In step S15, the mobile telephone terminal 1 on the call originating side establishes a connection with the fixed-line telephone terminal 3. Furthermore, the mobile telephone terminal 1 on the call originating side notifies the fixed-line telephone terminal 3 of the call setting request for the mobile telephone terminal 2 on the call receiving side.

In step S16, the fixed-line telephone terminal 3 notifies the fixed-line telephone network 41 of the call setting request received in step S15. This call setting request includes the terminal ID of the fixed-line telephone terminal 3, "ID3" and the terminal ID of the mobile telephone terminal 2 on the call receiving side, "ID2." The switching system 411 of the fixed-line telephone network 41 transfers the call setting request received from the fixed-line telephone terminal 3 to the switching system 412 of the mobile telephone terminal network 42.

In step S17, the switching system 412 of the mobile telephone network 42 determines whether the mobile telephone terminal 2 on the call receiving side has been registered on a call waiting service since the mobile telephone terminal 2 is in the middle of the call. Here, it is assumed that a determination is made that the mobile telephone terminal 2 on the call receiving side has been registered on a call waiting service.

In step S18, the mobile telephone network 42 (base station 414) broadcasts the call-out signal including the terminal ID of the fixed-line telephone terminal 3, "ID3" and the terminal of the mobile telephone terminal 2 on the call receiving side, "ID2."

In step S19, the mobile telephone terminal 2 determines with reference to the aforementioned user information whether the terminal ID "ID3" notified in step S18 and the terminal ID "ID1" stored in step S13 are associated with the same user (user ID). Here, since the terminal ID "ID3" and terminal ID "ID1" are associated with the same user, the mobile telephone terminal 2 on the call receiving side determines that this is a call from the user in the middle of the call with the mobile terminal phone 2 at this time.

In step S20, the mobile telephone terminal 2 on the call receiving side automatically switches to a call that uses the fixed-line telephone network 41. Specifically, the mobile telephone terminal 2 on the call receiving side switches the other party of the call from the mobile telephone terminal 1 to the fixed-line telephone terminal 3.

In step S21, the mobile telephone terminals 1 and 2 begin a call via the fixed-line telephone terminal 3.

As has been described so far, in a case where the mobile telephone terminal 1 on the call originating side is connected to the fixed-line telephone terminal 3 during the call, the mobile telephone terminal 2 on the call receiving side can automatically switch to the call with fixed-line telephone terminal 3 with reference to the user information.

(2) Call Originating Side Terminal

Next, a description will be given of the mobile telephone terminal 1 on the call originating side with reference to FIGS. 3 and 4.

(2.1) Configuration of Call Originating Side Terminal

Figure 3:
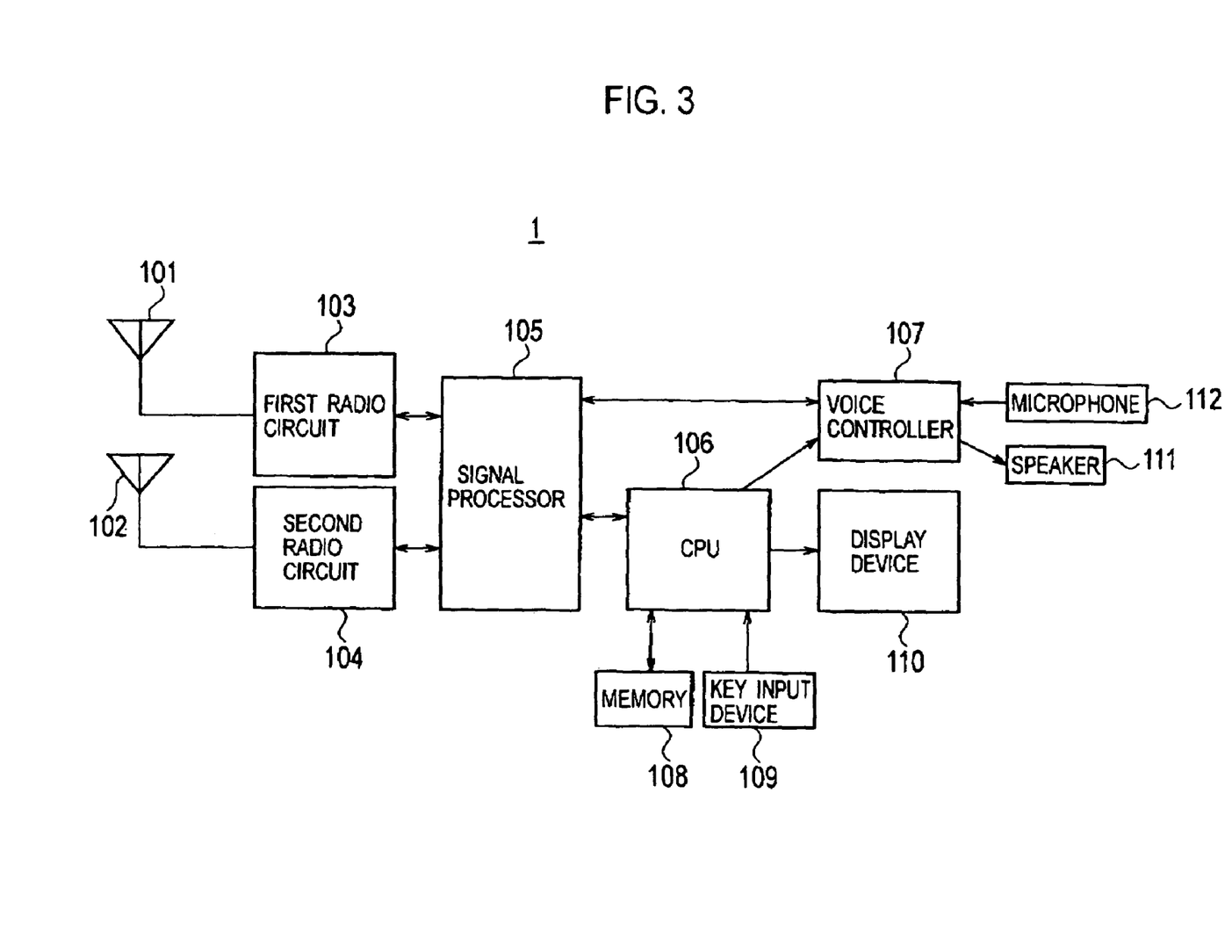
FIG. 3 is a block diagram showing an example of a hardware configuration of a mobile telephone terminal on a call originating side according to the first embodiment of the invention.

FIG. 3 is a block diagram showing an example of a hardware configuration of the mobile telephone terminal 1.

The mobile telephone terminal 1 includes a first antenna 101, a second antenna 102, a first radio circuit 103, a second radio circuit 104, a signal processor 105, a CPU 106, a memory 108, a key input device 109, an voice controller 107, a microphone 112, a speaker 111 and a display device 110.

The first radio circuit 103 includes a configuration compliant with a CDMA system, a GSM system or the like, for example, and is used when communicating with the mobile telephone network 42.

On the other hand, the second radio circuit 104 is capable of communicating with the fixed-line telephone terminal 3 and includes a configuration compliant with a wireless LAN system such as IEEE 802.11a/b/g, for example, or a short-range wireless communication system such as Bluetooth (registered trademark). In addition, the second radio circuit 104 establishes a connection with the fixed-line telephone terminal 3 in accordance with a predetermined protocol in a case where the fixed-line telephone terminal 3 exists within a communicable range.

The microphone 112 converts voice from a user into an voice signal and then inputs the voice signal to the voice controller 107. The voice controller 107 converts the voice signal from the microphone 112 into a digital voice signal and then inputs the digital voice signal to the signal processor 105.

During the execution of a call using the first radio circuit 103, the signal processor 105 converts the voice signal from the voice controller 107 into an voice signal with a timing and in a format, which are appropriate to the call, and then inputs the voice signal to the first radio circuit 103 after the conversion.

The first radio circuit 103 up-converts the frequency of the voice signal, then creates a radio signal and then transmits the created radio signal from the first antenna 1 as an electric wave.

During the execution of the call using the second radio circuit 104, the signal processor 105 converts the voice signal into an voice signal with a timing and in a format, which are appropriate to the call, and then inputs the voice signal into the second radio circuit 104 after the conversion.

The second radio circuit 104 up-converts the frequency of the voice signal from the signal processor 105, then creates a radio signal and then transmits the created radio signal from the second antenna 2 as an electric wave.

The CPU 106 is configured to operate in accordance with a program stored in the memory 108 and to control the entire mobile telephone terminal 1. The memory 108 is configured of a ROM, a RAM, a non-volatile memory or the like and is configured to store various data therein.

The key input device 109 includes numeric keys used for inputting a phone number of the other party at the time of originating a call. The key input device 109 also includes a call originating key used for issuing an instruction to begin the call, and a call end key used for issuing an instruction to end the call. In a case where there is an input operation from a user, the key input device 109 notifies the CPU 106 of the contents of the operation.

The display device 110 is a liquid crystal display (LCD), and is configured to display various information under the control of the CPU 106.

(2.2) Operation of Call Originating Side Terminal

Figure 4:
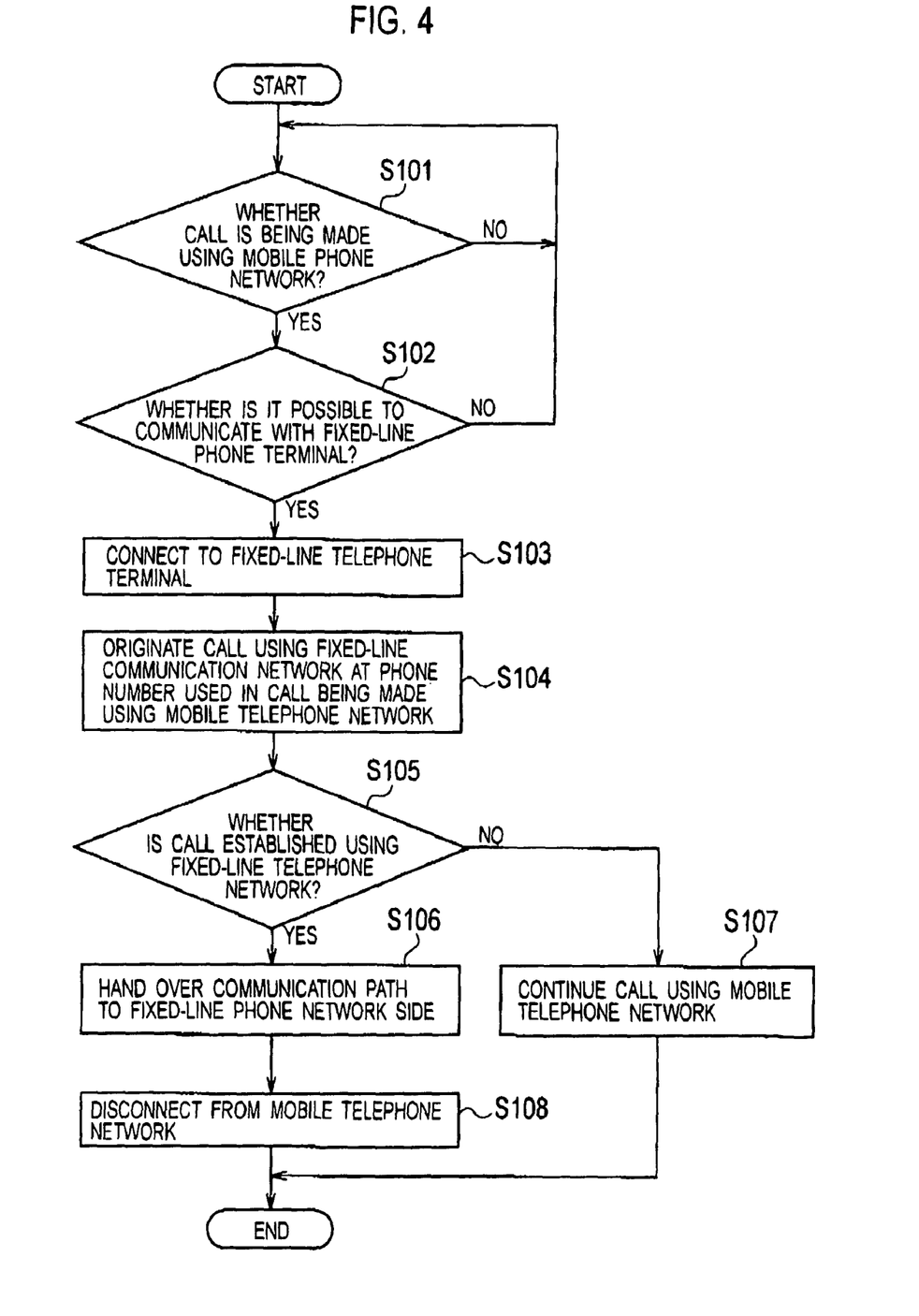
FIG. 4 is a flowchart showing au example of an operation of a mobile telephone terminal on the call originating side according to the first embodiment.

Next, a description will be given of an operation of the mobile telephone terminal 1 on the call originating side in detail FIG. 4 is a flowchart showing an example of the operation of the mobile telephone terminal 1.

In step S101, the mobile telephone terminal 1 makes a call to the mobile telephone terminal 2 via the mobile telephone network 42. The terminal ID of the mobile telephone terminal 2 is stored in the memory 108, for example.

In step S102, the second radio circuit 104 of the mobile telephone terminal 1 determines whether it is possible to connect to the fixed-line telephone terminal 3. In a case where the second radio circuit 104 can be connected to the fixed-line telephone terminal 3. The operation proceeds to step S103. In a case where the second radio circuit 104 cannot be connected to the fixed-line telephone terminal 3, the operation returns to step S101.

In step S103, the second radio circuit 104 is connected to the fixed-line telephone terminal 3.

In step S104, the CPU 106 of the mobile telephone terminal 1 specifies the terminal ID (phone number) of the mobile telephone terminal 2, which is in the middle of a call with the mobile telephone terminal 1, and then originates a call from the fixed-line telephone network 41 as well by use of the second radio circuit 104.

In step S105, the CPU 106 of the mobile telephone terminal 1 determines whether the call is established with the mobile telephone terminal 2 via the fixed-line telephone network 41. In a case where the call is established via the fixed-line telephone network 41, the operation proceeds to step S106. In a case where the call is not established via the fixed-line telephone network 41, the operation proceeds to step S107. In step S107, the mobile telephone terminal 1 continues the call with the mobile telephone terminal 2 via the mobile telephone network 42.

In step S106, the CPU 106 of the mobile telephone terminal 1 hands over the communication path to the fixed-line telephone network 41. Specifically, the CPU 106 controls the voice signal inputted from the microphone 112 to be transmitted from the second antenna 2 via the voice controller 107, the signal processor 105 and the second radio circuit 104.

In step S108, the CPU 106 disconnects the mobile telephone terminal 1 from the mobile telephone network 42.

As described above, the mobile telephone terminal on the call originating side begins communications with the fixed-line telephone terminal 3 (fixed-line telephone network 41) while the communications via the mobile telephone network 42 are being performed, and then hands over the call via the mobile telephone network 42 to the call via the fixed-line telephone terminal 3 (via the fixed-line telephone network 41).

(3) Call Reviving Side Terminal

Next, a description will be given of the mobile telephone terminal 2 on the call receiving side with reference to FIGS. 5 to 7.

(3.1) Hardware Configuration of Call Receiving Side Terminal

Next, a description will be given of a hardware configuration of the mobile telephone terminal 2 on the call receiving side. FIG. 5 is a block diagram showing an example of a hardware configuration of the mobile telephone terminal 2.

The mobile telephone terminal 2 on the call receiving side is different from the mobile telephone terminal 1 in that the mobile telephone terminal 2 includes only one channel of radio communication interface.

The mobile telephone terminal 2 is provided with an antenna 201, a radio circuit 203, a signal processor 205, a CPU 206, a memory 209, a key input device 209, an voice controller 207, a microphone 212, a speaker 211 and a display device 210.

Figure 5:
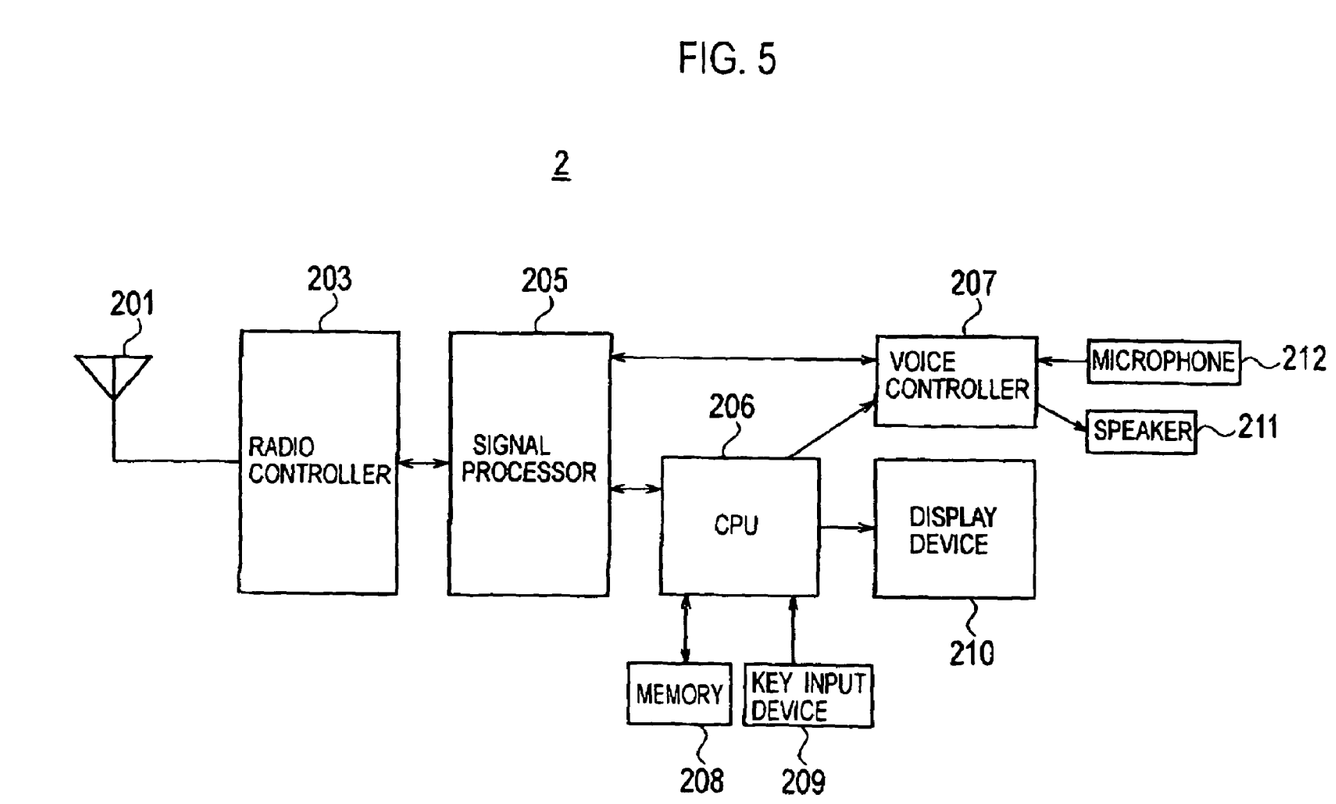
FIG. 5 is a block diagram showing an example of a hardware configuration of a mobile telephone terminal on a call receiving side according to the first embodiment of the invention.
Figure 6:
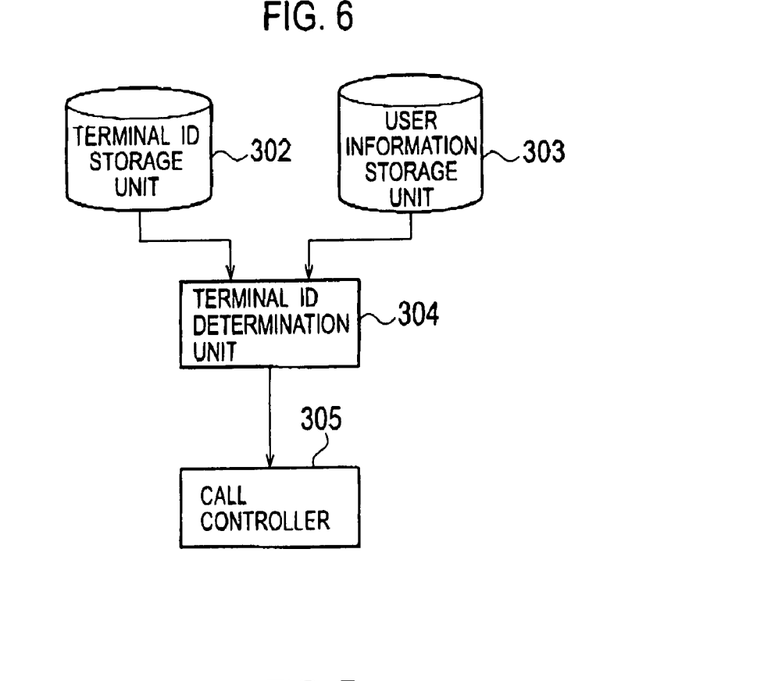
FIG. 6 is a block diagram showing an example of an overview of a functional configuration of a mobile telephone terminal on the call receiving side according to the first embodiment of the invention.

The radio circuit 203 of FIG. 5 includes the same configuration as that of the first radio circuit 103 of FIG. 3. The other components of the configuration are the same as those of the mobile telephone terminal 1 on the call originating side.

The radio circuit 203 down-converts an electric wave received by the antenna 201, then creates an voice signal, and then inputs the created voice signal to the signal processor 205.

The signal processor 205 performs a signal processing operation required for the communications, and then inputs the voice signal to the voice controller 207. The voice controller 207 converts the voice signal into an analog signal in accordance with an instruction from the CPU 206, and then outputs voice from the speaker 211.

(3.2) Function Blocks of Call Receiving Side Terminal

Next, a description will be given of a configuration of function blocks of the mobile telephone terminal 2 on the call receiving side. FIG. 6 is a block diagram showing a configuration example of function blocks of the mobile telephone terminal 2.

The CPU 206 executes functions of a terminal identifier determination unit 304 and a call controller 305 by running a program stored in the memory 208.

A terminal ID storage unit 302 and a user information storage unit 303 are included in the memory 208.

Figure 7:
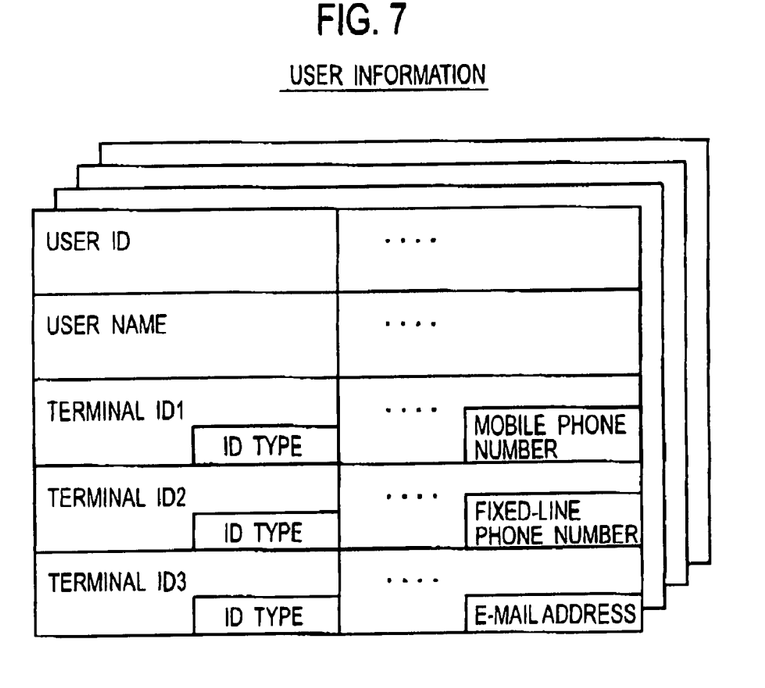
FIG. 7 is a schematic diagram showing an example of user information according to the first embodiment of the invention.

The user information storage unit 303 stores user information in which a user ID, a user name and a terminal ID are associated with one another as shown in FIG. 7.

Here, the terminal ID is stored for each type of terminal ID. In the example shown in FIG. 7, the ID type of terminal ID, ID1 is a mobile telephone number and the ID type of terminal ID, ID2 is a fixed-line telephone number. Furthermore, the ID type of terminal ID, ID3 is an e-mail address in the example shown in FIG. 7.

(3.3) Operation of Call Receiving Side Terminal

Figure 8:
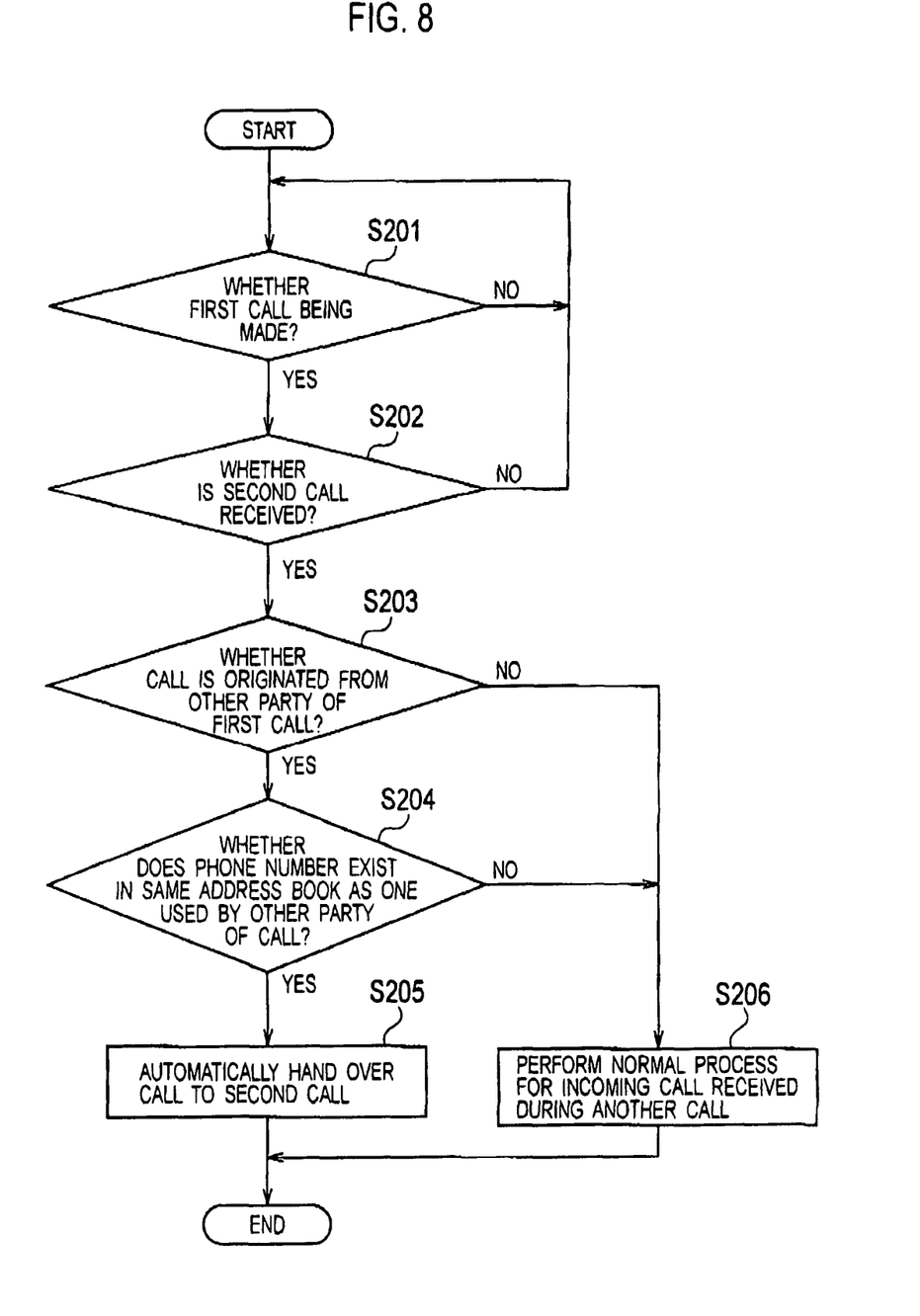
FIG. 8 is a flowchart showing an example of an operation of a mobile telephone terminal on the call receiving side according to the first embodiment of the invention.

Next, a description will be given of a detailed operation of the mobile telephone terminal 2 on the call receiving side. FIG. 8 is a flowchart showing an example of the operation of the mobile telephone terminal 2.

In step S201, the call controller 305 determines whether the mobile telephone terminal 2 on the call receiving side is in a call with the mobile telephone terminal 1 on the call originating side. In a case where the mobile telephone terminal 2 on the call receiving side is in a call with mobile telephone terminal 1 on the call originating side, the operation proceeds to step S202. The terminal ID of the mobile telephone terminal 1 on the call originating side is stored in the terminal ID storage unit 302.

In step S202, the call controller 305 determines whether there is a new incoming call to the mobile telephone terminal 2 on the call receiving side during the call with the mobile telephone terminal 1 on the call originating side. In a case where there is a new incoming call, the operation proceeds to step S203. In a case where there is no new incoming call during the call with the mobile telephone terminal 1 on the call originating side, the operation returns to step S201.

In step S203, the call controller 305 determines whether the call being made in step S201 is originated from its own telephone terminal or is originated from the telephone terminal of the other party of the call.

In a case where the call being made in step S201 is originated from its own telephone terminal, the operation proceeds to step S206. In a case where the call being made in step S201 is originated from the telephone terminal of the other party of the call, the operation proceeds to step S204.

In step S204, the terminal ID determination unit 304 retrieves the terminal ID stored in step S201 and the terminal ID notified in step S202 from the user information storage unit 303, and then determines whether the terminal IDs are associated with the same user.

In a case where the terminal IDs are associated with the same user, the operation proceeds to step S205. In a case where the terminal IDs are associated with different users, or in a case where any one of the terminal IDs are not registered on the user information storage unit 303, the operation proceeds to step S206.

In step S205, the call controller 305 automatically switches the call being made to the new call received in step S202.

It should be noted that normal processing of an incoming call received during another call is executed in step S206.

(4) Functions and Advantageous Effects

As described above, according to the first embodiment, during a call using the mobile telephone network 42, the mobile telephone terminal 1 on the call originating side automatically hands over the call to the fixed-line telephone network 41 without disconnecting the call.

In a case where the mobile telephone terminal 1 on the call originating side is connected to the fixed-line telephone terminal 3 during a call, the mobile telephone terminal 2 on the call receiving side automatically hands over the call to the fixed-line telephone terminal 3 after checking the user information. In other words, in a case where there is a new incoming call to the mobile telephone terminal 2 on the call receiving side from a different communication terminal during a call with a certain terminal, a handover of the call can be performed when it is determined that the user of the terminal of the other party of the call and the user of the terminal on the call originating side of the new incoming call are the same.

Thereby, the charge for the call can be reduced mid a stable call can be made.

In addition, the aforementioned call handover can be performed without adding a change in the configuration of the existing communication network 4. Thus, it does not require a significant amount of development costs. Specifically, without being tied to its phone service company or its phone number, a call handover from the mobile telephone network 42 to the fixed-line telephone network 41 can be performed.

Moreover, since the function of an existing address book is utilized, a call handover can be performed without adding a specific database.

Modification of First Embodiment

Furthermore, as a modification of the first embodiment of the invention, a description will be given of a case where a user of the mobile telephone terminal 2 on the call receiving side is allowed to select whether to perform a call handover.

Figure 9:
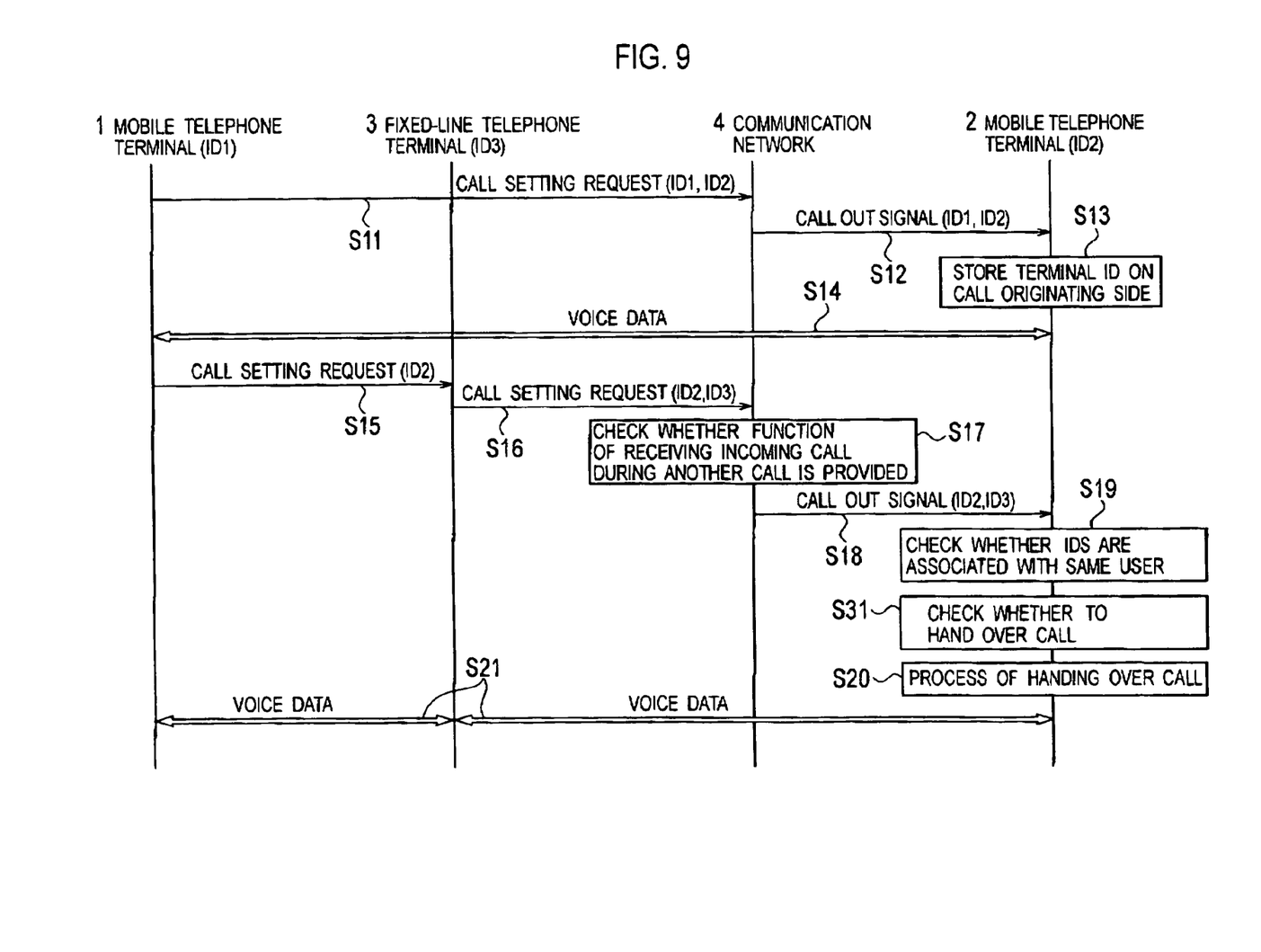
FIG. 9 is a sequence diagram showing a call handover method according to a modification of the first embodiment of the invention.

FIG. 9 is a sequence diagram showing a call handover method according to this modification.

In step S31 in FIG. 9, the mobile telephone terminal 2 on the call receiving side prompts the user to select whether to hand over a call.

Specifically, in step S31 in FIG. 9, the mobile telephone terminal 2 on the call receiving side displays on the display device 210 a message "There is an incoming call from the other party of the current call. Would you like to hand over the call?", or outputs the message with voice from the speaker 211 or the like.

Accordingly, in this modification, in a case where the charge for a call can be less expensive when the call using the mobile telephone network 42 is continued instead of performing a call handover, the user can select not to hand over the call to the fixed-line telephone network 41 on the basis of his or her own decision.

Second Embodiment

As a second embodiment of the present invention, a description will be given of a case where the mobile telephone terminal 2 is the terminal on the call originating side and the mobile telephone terminal 1 is the terminal on the call receiving side.

Figure 10:
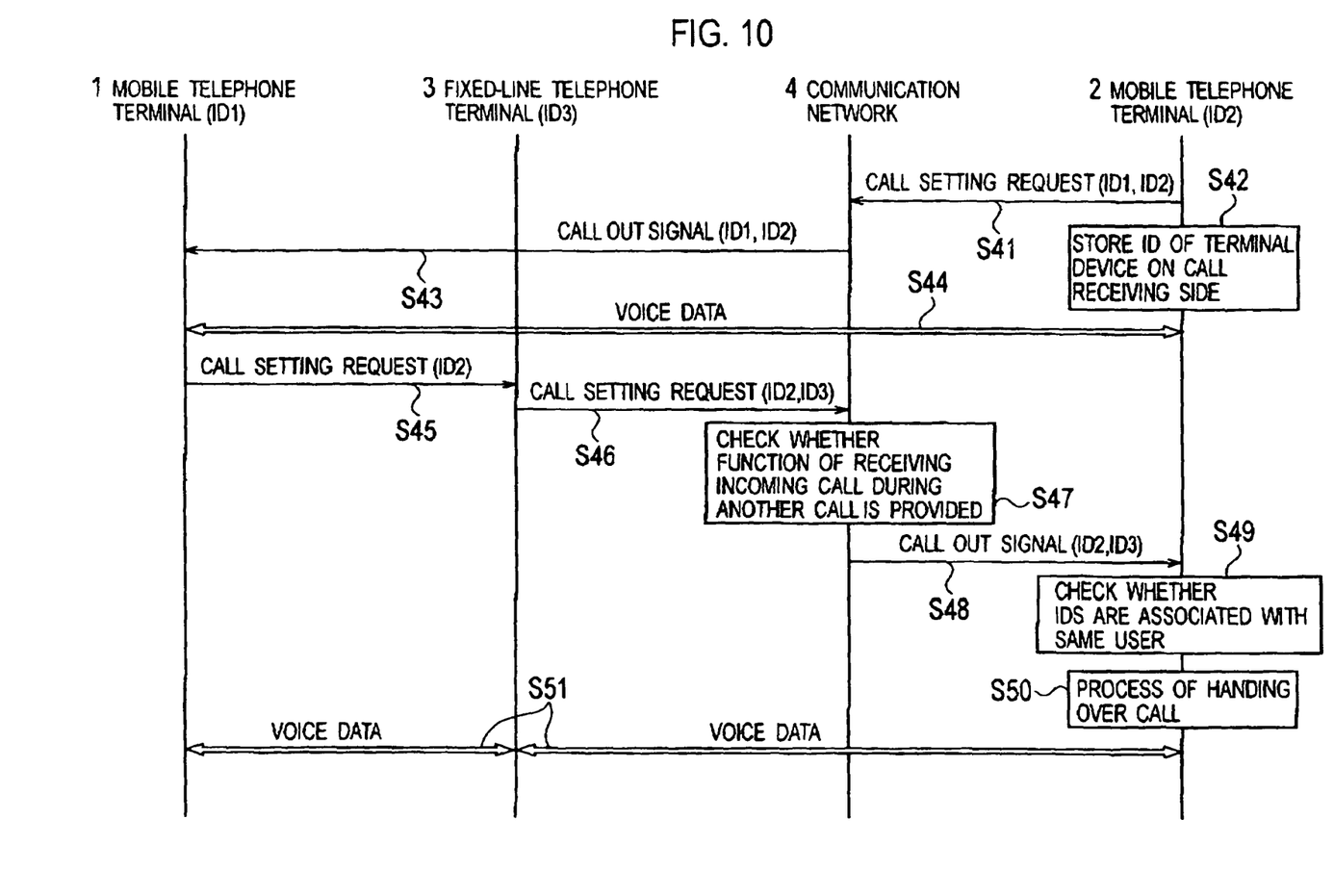
FIG. 10 is a sequence diagram showing a call handover method according a second embodiment of the invention.

FIG. 10 is a sequence diagram showing a call handover method according to the present embodiment. It should be noted that the hardware configuration of the mobile telephone terminal 1 is the same as one shown in FIG. 3 and the hardware configuration of the mobile telephone terminal 2 is the same as one shown in FIG. 5.

In step S41 in FIG. 10, the mobile telephone terminal 2 on the call originating side transmits a call setting request for the mobile telephone terminal 1 on the call receiving side. The call setting request transmitted from the mobile telephone terminal 2 on the call originating side to the communication network 4 (mobile telephone network 42) includes the terminal ID of the mobile telephone terminal 2 itself "ID2" and the terminal ID of the mobile telephone terminal "ID1".

In step 42, the mobile telephone terminal 2 on the call originating side stores the terminal ID "ID1" of the mobile telephone terminal 1.

In step S43, the mobile telephone network 42 broadcasts a call-out signal including the terminal ID of the mobile telephone terminal 1, "ID1" and the terminal ID of the mobile telephone terminal 2, "ID2,".

In step S44, a call between the mobile telephone terminal 1 and the mobile telephone terminal 2 begins. Here, an assumption is made that the mobile telephone terminal 1 on the call receiving side has moved, so that the mobile telephone terminal 1 on the call receiving side can thus be connected to the fixed-Line telephone terminal 3.

In step 45, the mobile telephone terminal 1 on the call receiving side establishes a connection with the fixed-line telephone terminal 3. Furthermore, the mobile telephone terminal 1 on the call receiving side notifies the fixed-line telephone terminal 3 of the call setting request for the mobile telephone terminal 2 on the call originating side.

In step S46, the fixed-line telephone terminal 3 notifies the fixed-line telephone network 41 of the call setting request received in step S45. This call setting request includes the terminal ID of the fixed-line telephone terminal 3, "ID3" and the terminal ID of the mobile telephone terminal 2 on the call originating side, "ID2." The switching system 411 of the fixed-line telephone network 41 transfers the call setting request to the switching system 412 of the mobile telephone network 42.

In step S47, since the mobile telephone terminal 2 is in a call, the switching system 412 of the mobile telephone network 42 determines whether the mobile telephone terminal 2 on the call originating side has been registered on a call waiting service.

Since the mobile telephone terminal 2 on the call originating side has been registered on a call waiting service, in step S48, the switching 412 of the mobile telephone network 42 broadcasts the call-out signal including the terminal ID of the fixed-line telephone terminal 3, "ID3" and the terminal ID of the mobile telephone terminal 2 on the call originating side, "ID2."

In step S49, the mobile telephone terminal 2 on the call originating side determines with reference to the aforementioned user information whether the terminal ID "ID1" stored in step S43 and the terminal 1 of the fixed-line telephone terminal 3, "ID3" notified in step S48 are associated with the same user.

Here, since the terminal ID "ID 1" and the terminal ID "ID3" are associated with the same user, the mobile telephone terminal 2 on the call originating side determines that it is an incoming call from the user in the call at this time.

In step S50, the mobile telephone terminal 2 on the call originating side automatically hands over the call to the fixed-line telephone network 41. As a result of this, in step S51, a call between the mobile telephone terminal 1 and the mobile telephone terminal 2 begins via the fixed-line telephone terminal 3.

As described above, according to the call handover method in the case of the second embodiment, during a call using the mobile telephone network 42, the mobile telephone terminal 1 on the call receiving side can automatically hand over the call to the fixed-line telephone network 41 without disconnecting the call.

Third Embodiment

As a third embodiment of the invention, a description will be given of a case where the mobile telephone terminal 2 in FIG. 1 is the terminal on the call originating side, and the mobile telephone terminal 1 is the terminal on the call receiving side.

Figure 11:
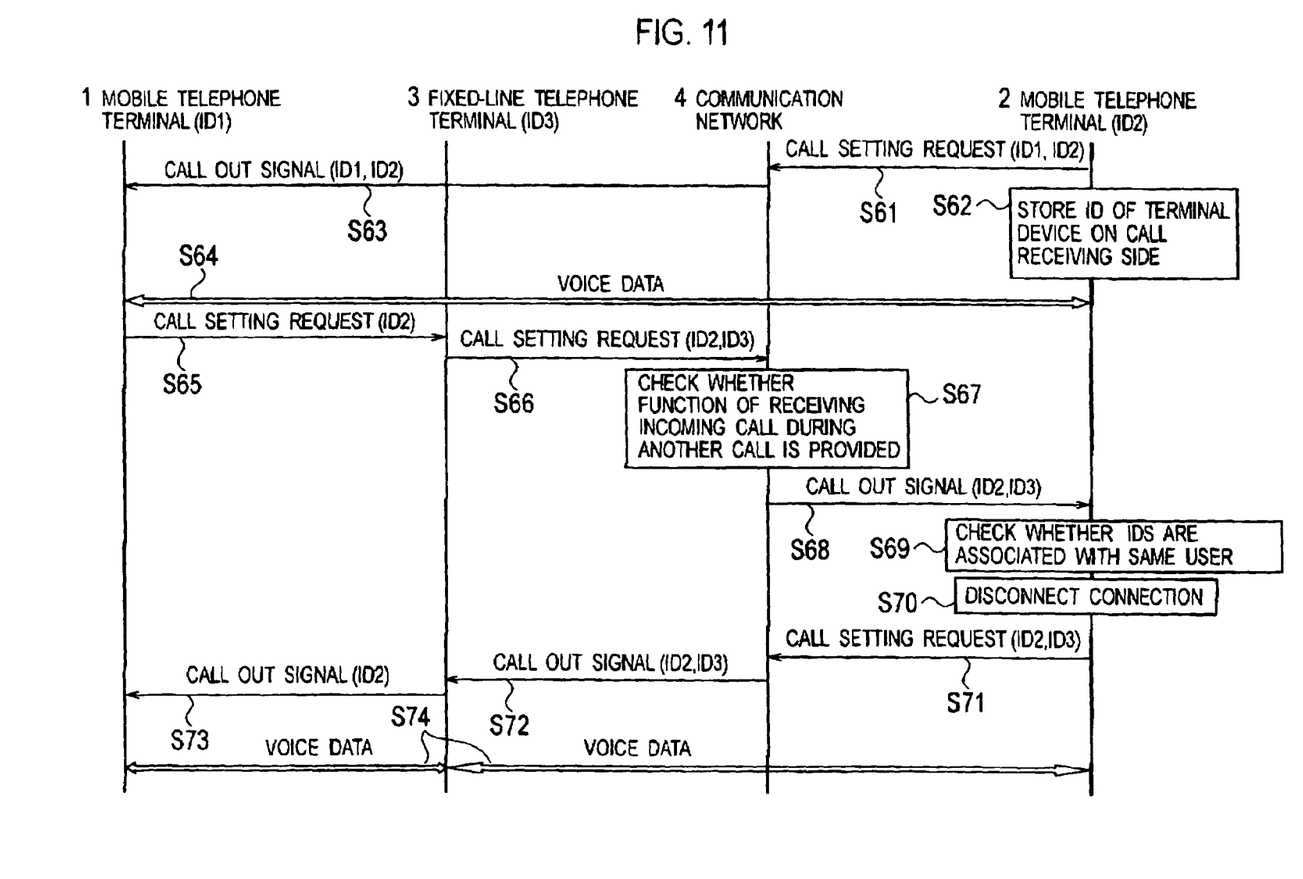
FIG. 11 is a sequence diagram showing a call handover method according to a third embodiment of the invention.

FIG. 11 is a sequence diagram showing a call handover method according to the third embodiment. It should be noted that the hardware configuration of the mobile telephone terminal 1 is the same as one shown in FIG. 3 and the hardware configuration of the mobile telephone terminal 2 is the same as one shown in FIG. 5.

In step 61 in FIG. 11, the mobile telephone terminal 2 on the call originating side transmits a call setting request for the mobile telephone terminal 1 on the call receiving side. The call setting request transmitted from the mobile telephone terminal 2 on the call originating side to the communication network 4 (mobile telephone network 42) includes the terminal ID of the mobile telephone terminal 2 itself, "ID2" and the terminal ID of the mobile telephone terminal 1, "ID1".

In step S62, the mobile telephone terminal 2 on the call originating side stores the terminal ID of the mobile telephone terminal 1 on the call receiving side, "ID1".

In step S63, the mobile telephone network 42 broadcasts the call-out signal including the terminal ID of the mobile telephone terminal 1, "ID1" and the terminal ID of the mobile telephone terminal 2, "ID2." The mobile telephone terminal 1 on the call receiving side receives the call-out signal.

In step S64, a call between the mobile telephone terminal 1 and the mobile telephone terminal 2 begins. Here, an assumption is made that the mobile telephone terminal 2 on the call receiving side has moved, so that the mobile telephone terminal 1 on the call receiving side can be connected to the fixed-line telephone terminal 3.

In step S65, the mobile telephone terminal 1 on the call receiving side establishes a connection to the fixed-line telephone terminal 3. Furthermore, the mobile telephone terminal 1 on the call receiving side notifies the fixed-line telephone terminal 3 of the call setting request for the mobile telephone terminal 2 on the call originating side.

In step S66, the fixed-line telephone terminal 3 notifies the fixed-line telephone network 41 of the call setting request notified in step S65. This call setting request includes the terminal ID of the fixed-line telephone terminal 3, "ID3" and the terminal ID of the mobile telephone terminal 2 on the call originating side, "ID2." The switching system 411 of the fixed-line telephone network 41 transfers the call setting request to the switching system 412 of the mobile telephone network 42.

In step S67, since the mobile telephone terminal 2 is in a call the switching system 412 of the mobile telephone network 42 determines whether the mobile telephone terminal 2 on the call originating side has been registered on a call waiting service. Since the mobile telephone terminal 2 on the call originating side has been registered on a call waiting service, in step S68, the switching system 412 of the mobile telephone network 42 broadcasts the call-out signal including the terminal ID of the fixed-line telephone terminal 3, "ID3" and the terminal ID of the mobile telephone terminal 2 on the call originating side, "ID2."

In step S69, the mobile telephone terminal 2 on the call originating side determines with reference to the aforementioned user information whether the terminal ID "ID1" stored in step S63 and the terminal ID "ID3" notified ID3 step S68 are associated with the same user. Here, since the terminal ID "ID1" and the terminal ID "ID3" are associated with the same user ID, the mobile telephone terminal 2 on the call originating side determines that it is an incoming call from the user in the call at this time.

In step S70, the mobile telephone terminal 2 on the call originating side disconnects the call with the mobile telephone terminal 1 once, and in the meantime, transmits the call setting request for the fixed-line telephone terminal 3 in step S71.

In step S72, the switching system 412 of the mobile telephone network 42 transfers the call setting request transmitted in step S71 to the switching system 411 of the fixed-line telephone network 41. As a result of this, the fixed-line telephone network 41 transmits the call-out signal to the fixed-line telephone terminal 3. Moreover, its step S73, the fixed-line telephone terminal 3 transfers the call-out signal to the mobile telephone terminal 1.

In step S74, a call between the mobile telephone terminal 1 and the mobile telephone terminal 2 begins via the fixed-line telephone terminal 3.

As described above, according to the call handover method of the third embodiment, since the mobile telephone terminal 2 on the call originating side becomes the terminal on the call originating side for both of the first and second calls, it is possible to easily control the charges for the calls.

Other Embodiments

Although the present invention has been described through the embodiments, it is not to be understood that any description or drawing constituting a part of this disclosure limits the present invention. From this disclosure, various alternative embodiments, examples and operation techniques should become clear to those skilled in the art.

In the aforementioned embodiments, as an example of a call waiting service, "Catch Phone" (registered trademark) service is cited. Other services, however, can be used as long as they provide similar services to the one described in the embodiments.

Moreover, although the descriptions have been given of cases where a mobile telephone terminal is used as a mobile communication terminal, a PHS terminal or the like may be used in place of the mobile telephone terminal.

As described above, it is to be understood that the present invention includes various embodiments not described herein. Accordingly, the technical scope of the invention should be determined on the basis of specified features of the aforementioned inventive descriptions and appropriate appended claims.

What is claimed is:

1. A mobile communication terminal comprising:
a radio communication unit configured to perform radio communications;
a user information storage unit configured to store user information in which a terminal identifier for identifying an arbitrary communication terminal, and a user identifier for identifying a user of the arbitrary communication terminal are associated with each other;
an identifier storage unit configured to store, when performing a call with a communication terminal of the other party of the call via the radio communication unit, a first identifier for identifying the communication terminal of the other party of the call;
a terminal identifier determination unit configured to determine whether the first terminal identifier stored in the identifier storage unit and a second terminal identifier included in a call-out signal are associated with the same user identifier, with reference to the user information stored in the user information storage unit, in a case where the radio communication unit receives the call-out signal including the second terminal identifier during the call with the communication terminal of the other party via the radio communication unit; and
a call controller configured to control the radio communication unit to hand over the call to a communication terminal indicated by the second terminal identifier in a case where the terminal identifier determination unit determines that the first terminal identifier stored in the identifier storage unit and the second terminal identifier included in the call-out signal are associated with the same user identifier.

2. The mobile communication terminal according to claim 1, wherein the user information is created by a function of an address book.

3. The mobile communication terminal according to claim 1, wherein, in the case where the terminal identifier determination unit determines that the first terminal identifier stored in the identifier storage unit and the second terminal identifier included in the call-out signal are associated with the same user identifier, the call controller controls the radio communication unit to automatically begin the call with the communication terminal indicated by the second identifier included in the call-out signal.

4. The mobile communication terminal according to claim 1 further comprising a display unit,
 wherein, in the case where the terminal identifier determination unit determines that the first terminal identifier stored in the identifier storage unit and the second terminal identifier included in the call-out signal are associated with the same user identifier, the call controller controls the display unit to display that a party currently calling and a party corresponding to the call-out signal are the same, and
in accordance with an operation which responds to the call-out signal and which is made by the user, the call controller controls the radio communication unit to begin the call with the communication terminal indicated by the second terminal identifier included in the call-out signal.

* * * * *